(12) United States Patent
Kim et al.

(10) Patent No.: US 12,205,768 B2
(45) Date of Patent: Jan. 21, 2025

(54) MULTILAYER ELECTRONIC COMPONENT

(71) Applicant: SAMSUNG ELECTRO-MECHANICS CO., LTD., Suwon-si (KR)

(72) Inventors: Sun Hwa Kim, Suwon-si (KR); Hoe Chul Jung, Suwon-si (KR); Yun Sung Kang, Suwon-si (KR); Byeong Gyu Park, Suwon-si (KR); Won Jun Na, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 156 days.

(21) Appl. No.: 18/114,394

(22) Filed: Feb. 27, 2023

(65) Prior Publication Data

US 2024/0177932 A1    May 30, 2024

(30) Foreign Application Priority Data

Nov. 30, 2022    (KR) .................. 10-2022-0164460

(51) Int. Cl.
*H01G 4/232*    (2006.01)
*H01G 4/012*    (2006.01)
(Continued)

(52) U.S. Cl.
CPC .............. *H01G 4/232* (2013.01); *H01G 4/012* (2013.01); *H01G 4/248* (2013.01); *H01G 4/30* (2013.01)

(58) Field of Classification Search
CPC ........ H01G 4/232; H01G 4/012; H01G 4/248; H01G 4/30; H01G 4/32
See application file for complete search history.

(56) References Cited

U.S. PATENT DOCUMENTS

| 9,966,191 B2 * | 5/2018 | Noda ...................... C03C 3/089 |
| 2006/0067029 A1 * | 3/2006 | Kuniyasu ............. H10N 30/088 |
| | | 361/302 |

(Continued)

FOREIGN PATENT DOCUMENTS

| JP | 2003-347152 A | 12/2003 |
| JP | 2022-095349 A | 6/2022 |
| JP | 2022-133831 A | 9/2022 |

*Primary Examiner* — Michael P McFadden
(74) *Attorney, Agent, or Firm* — Morgan, Lewis & Bockius LLP

(57) ABSTRACT

A multilayer electronic component includes a body including a capacitance formation portion including dielectric layers and internal electrodes alternately disposed in a first direction, and a cover portion disposed on both end surfaces of the capacitance formation portion, facing each other in the first direction, and having a first surface and a second surface opposing each other in the first direction, a third surface and a fourth surface connected to the first and second surfaces and opposing each other in a second direction, and a fifth surface and a sixth surface connected to the first to fourth surfaces and opposing each other in a third direction, and external electrodes disposed on the third and fourth surfaces. The internal electrodes and the dielectric layers protrude more outwardly than the cover portion in the second direction, and a groove is disposed at an end of the dielectric layer in the second direction.

22 Claims, 5 Drawing Sheets

(51) Int. Cl.
*H01G 4/248* (2006.01)
*H01G 4/30* (2006.01)

(56) References Cited

U.S. PATENT DOCUMENTS

| | | | |
|---|---|---|---|
| 2006/0145401 A1* | 7/2006 | Mihara | H01G 4/232 |
| | | | 264/618 |
| 2008/0123248 A1* | 5/2008 | Kunishi | C25D 5/02 |
| | | | 361/306.3 |
| 2010/0328842 A1* | 12/2010 | Takeuchi | C25D 5/50 |
| | | | 361/301.4 |
| 2014/0209363 A1* | 7/2014 | Oh | H01G 4/12 |
| | | | 361/301.4 |
| 2016/0087189 A1* | 3/2016 | Lee | H01G 4/30 |
| | | | 29/25.35 |
| 2016/0268046 A1* | 9/2016 | Nishisaka | H01G 4/232 |
| 2017/0301471 A1* | 10/2017 | Ono | H01G 4/224 |
| 2018/0108481 A1* | 4/2018 | Tomizawa | H01G 4/2325 |
| 2019/0131074 A1* | 5/2019 | Mizuno | H01G 4/0085 |
| 2019/0164693 A1* | 5/2019 | Ono | H01G 4/30 |
| 2019/0318874 A1* | 10/2019 | Orimo | H05K 1/181 |
| 2022/0189701 A1 | 6/2022 | Murai | |
| 2022/0270820 A1* | 8/2022 | Abe | H01G 4/30 |
| 2022/0285093 A1 | 9/2022 | Hirabayashi et al. | |

\* cited by examiner

MULTILAYER ELECTRONIC COMPONENT

CROSS-REFERENCE TO RELATED APPLICATION (S)

This application claims benefit of priority to Korean Patent Application No. 10-2022-0164460 filed on Nov. 30, 2022 in the Korean Intellectual Property Office, the disclosure of which is incorporated herein by reference in its entirety.

TECHNICAL FIELD

The present disclosure relates to a multilayer electronic component.

BACKGROUND

A Multilayer Ceramic Capacitor (MLCC), a multilayer electronic component, is a chip-type capacitor serving to charge or discharge electricity by being mounted on the printed circuit boards of various electronic products such as video devices such as liquid crystal displays (LCDs) and plasma display panels (PDPs), computers, smartphones, and mobile phones.

A multilayer ceramic capacitor may be used as a component of various electronic devices due to advantages thereof, such as a small size, high capacitance, and ease of mounting thereof. As various electronic devices such as computers and mobile devices are miniaturized and become more highly-powered, demand for miniaturization and high-capacitance multilayer ceramic capacitors is increasing. In accordance with the trend toward miniaturization and high capacitance of multilayer ceramic capacitors, the importance of increasing the capacitance per unit volume of multilayer ceramic capacitors is increasing.

The multilayer ceramic capacitor may basically include a body in which dielectric layers and internal electrodes are stacked, and external electrodes disposed on the outside of the body. On the other hand, a difference in shrinkage rates between the dielectric layer and the inner electrodes may occur during the sintering process, and due to this difference in shrinkage, poor contact between the body and the external electrode may occur. In detail, poor contact between the internal electrode and the external electrode may cause variations in capacitance of the multilayer ceramic capacitor. Therefore, research into multilayer ceramic capacitors with improved contact between the body and external electrodes is required.

SUMMARY

An aspect of the present disclosure is to secure contact between a body and an external electrode.

An aspect of the present disclosure is to reduce variations in capacitance of a multilayer electronic component.

An aspect of the present disclosure is to implement an internal electrode having a relatively thin thickness.

According to an aspect of the present disclosure, a multilayer electronic component includes a body having a capacitance formation portion including dielectric layers and internal electrodes alternately disposed in a first direction, and a cover portion disposed on both end surfaces of the capacitance formation portion, facing each other in the first direction, the body having a first surface and a second surface opposing each other in the first direction, a third surface and a fourth surface connected to the first and second surfaces and opposing each other in a second direction, and a fifth surface and a sixth surface connected to the first to fourth surfaces and opposing each other in a third direction, and external electrodes disposed on the third and fourth surfaces. On at least one of the third and fourth surfaces, the internal electrodes and the dielectric layers of the capacitance formation portion protrude more outwardly than the cover portion, in the second direction, and a groove is disposed at an end of one of the dielectric layers in the second direction.

According to an aspect of the present disclosure, a multilayer electronic component includes a body having a capacitance formation portion including a dielectric layer and first and second internal electrodes alternately disposed in a first direction with the dielectric layer interposed therebetween, and a cover portion disposed on both end surfaces of the capacitance formation portion, facing each other in the first direction, the body having a first surface and a second surface opposing each other in the first direction, a third surface and a fourth surface connected to the first and second surfaces and opposing each other in a second direction, and a fifth surface and a sixth surface connected to the first to fourth surfaces and opposing each other in a third direction, and first and second external electrodes respectively disposed on the third and fourth surfaces and respectively connected to the first and second internal electrodes. On the third surface, the first internal electrode protrudes more outwardly than the cover portion in the second direction, and on the fourth surface, the second internal electrode protrudes more outwardly than the cover portion in the second direction, and a surface in contact with the first external electrode and the dielectric layer and a surface in contact with the second external electrode and the dielectric layer are curved surfaces.

According to an aspect of the present disclosure, a multilayer electronic component includes a body including a capacitance formation portion including dielectric layers and internal electrodes alternately disposed in a first direction, and a cover portion disposed on both end surfaces of the capacitance formation portion facing each other in the first direction; and external electrodes disposed on outer surfaces of the capacitance formation portion and outer surfaces of the cover portion, opposing each other in a second direction orthogonal to the first direction, and respectively connected to the internal electrodes, wherein, in the second direction, ends of the internal electrodes of the capacitance formation portion protrude from the respective outer surfaces of the cover portion, and the ends of the internal electrodes disposed in a center region of the capacitance formation portion in the first direction protrude more outwardly than the ends of the internal electrodes disposed in an outer region of the capacitance formation portion in the first direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
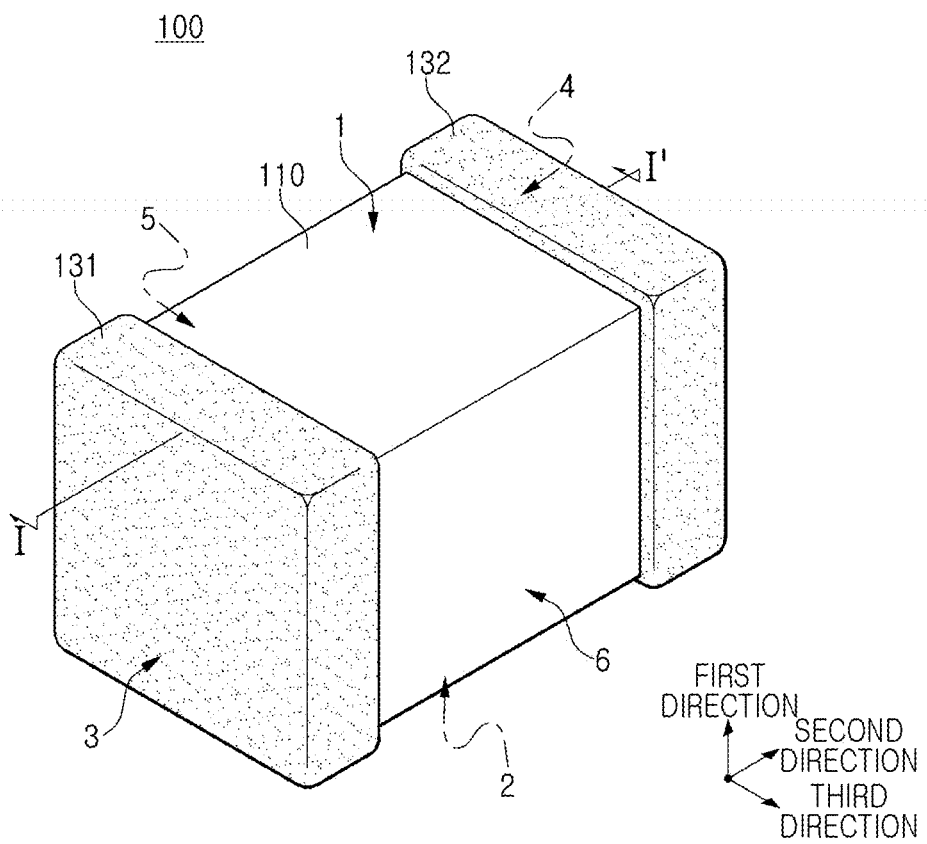
FIG. 1 is a perspective view schematically illustrating a multilayer electronic component according to an embodiment.

Hereinafter, embodiments of the present disclosure will be described with reference to detailed embodiments and accompanying drawings. However, the embodiments of the present disclosure may be modified in many different forms, and the scope of the present disclosure is not limited to the embodiments described below. In addition, the embodiments of the present disclosure are provided to more completely describe the present disclosure to those skilled in the art. Therefore, the shape and size of elements in the drawings may be exaggerated for clearer explanation, and elements indicated by the same reference numerals in the drawings are the same elements.

In addition, to clearly describe the present disclosure in the drawings, parts irrelevant to the description are omitted, and the size and thickness of each component illustrated in the drawings are arbitrarily illustrated for convenience of description, and thus, the present disclosure is not necessarily limited to the illustrated. Also, components having the same function within the scope of the same concept are described using the same reference numerals. Furthermore, throughout the specification, when a certain component is said to "include", it means that it may further include other components without excluding other components unless otherwise stated.

In the drawings, the first direction may be defined as the thickness (T) direction, the second direction may be defined as the length (L) direction, and the third direction may be defined as the width (W) direction.

FIG. 1 is a perspective view schematically illustrating a multilayer electronic component according to an embodiment.

Figure 2:
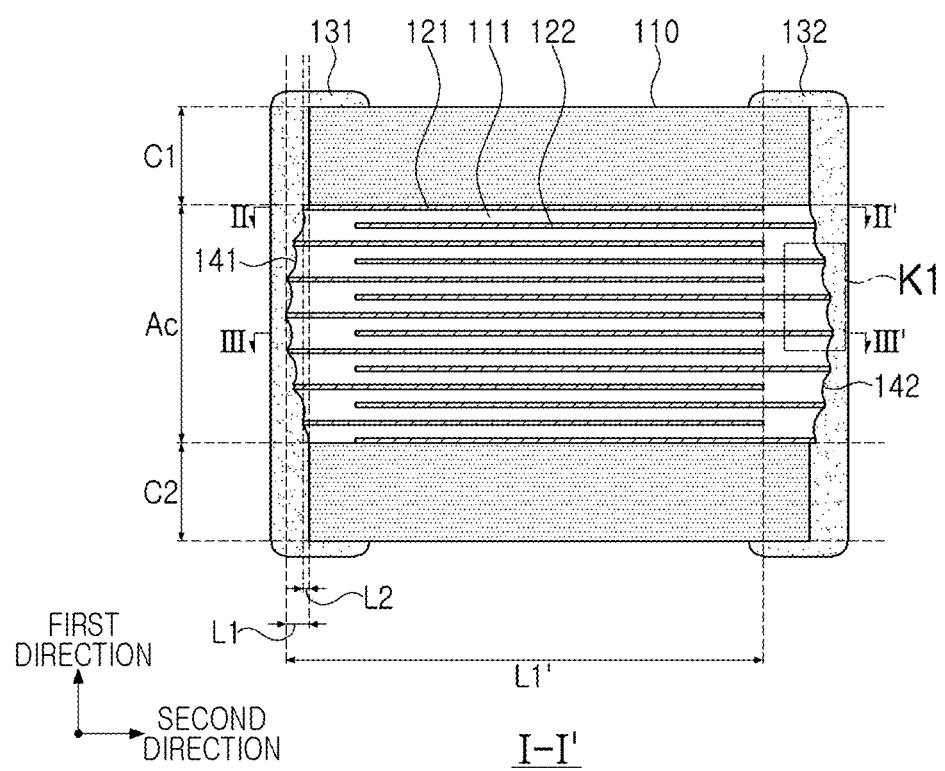
FIG. 2 is a cross-sectional view taken along line I-I' of FIG. 1.

FIG. 2 is a cross-sectional view taken along line I-I' of FIG. 1.

Figure 3:
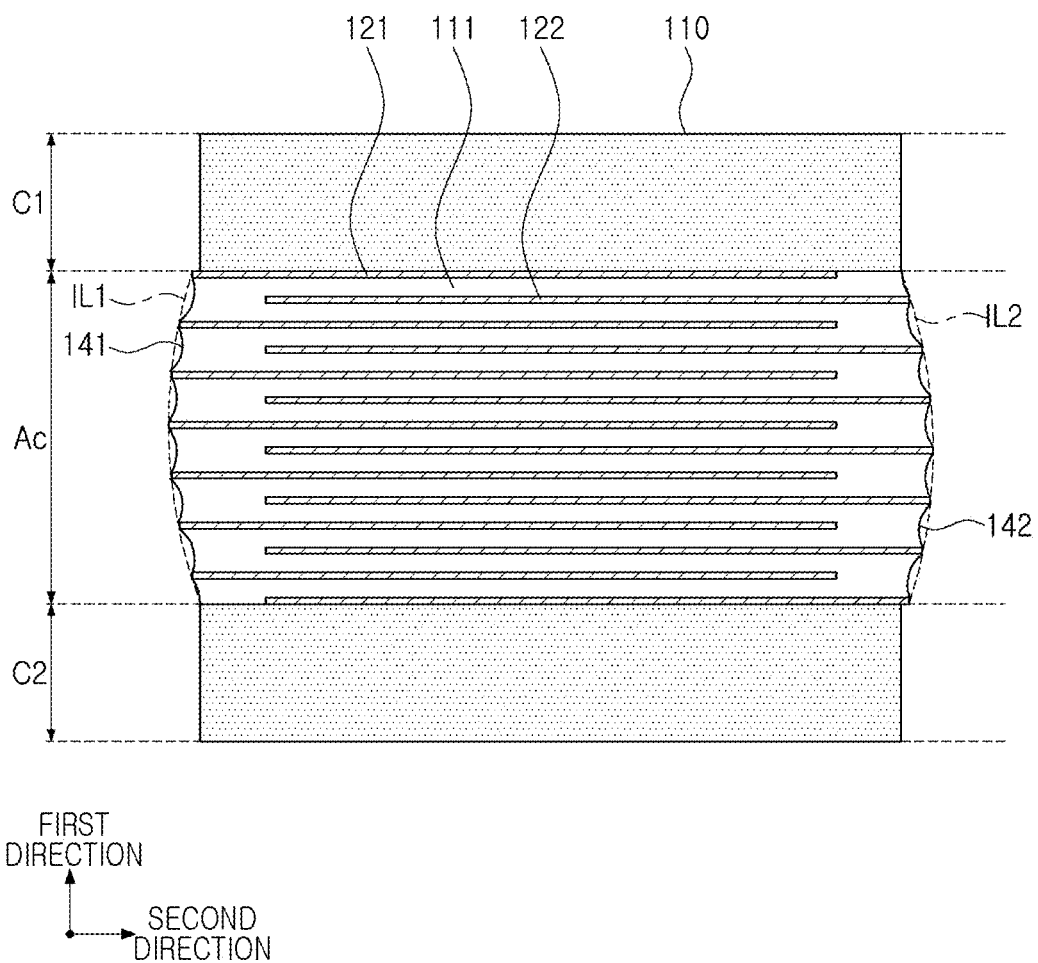
FIG. 3 is a cross-sectional view schematically illustrating a body of FIG. 2.

FIG. 3 is a cross-sectional view schematically illustrating a body of FIG. 2.

Figure 4:
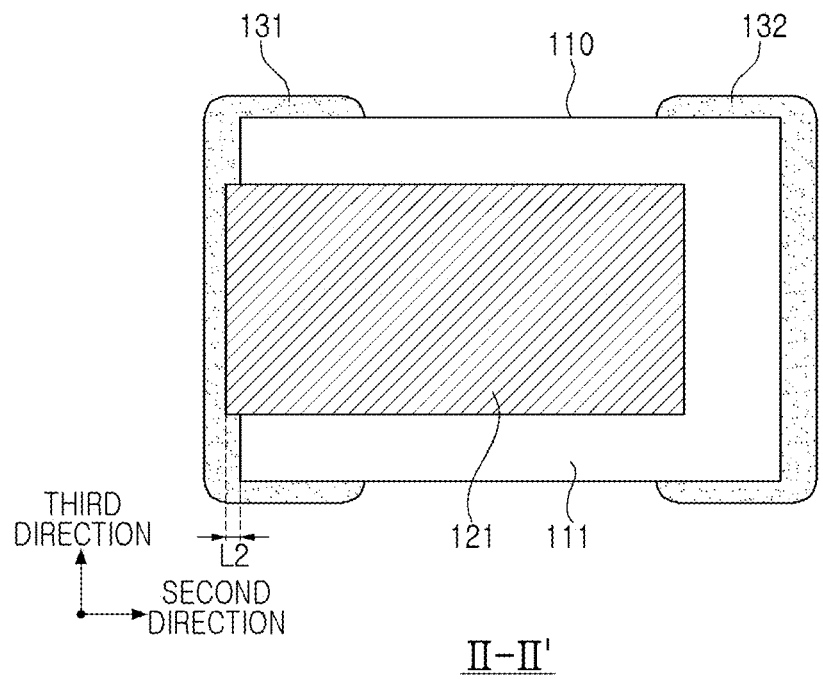
FIG. 4 is a cross-sectional view taken along line II-II' of FIG. 2.

FIG. 4 is a cross-sectional view taken along line II-II' of FIG. 2.

Figure 5:
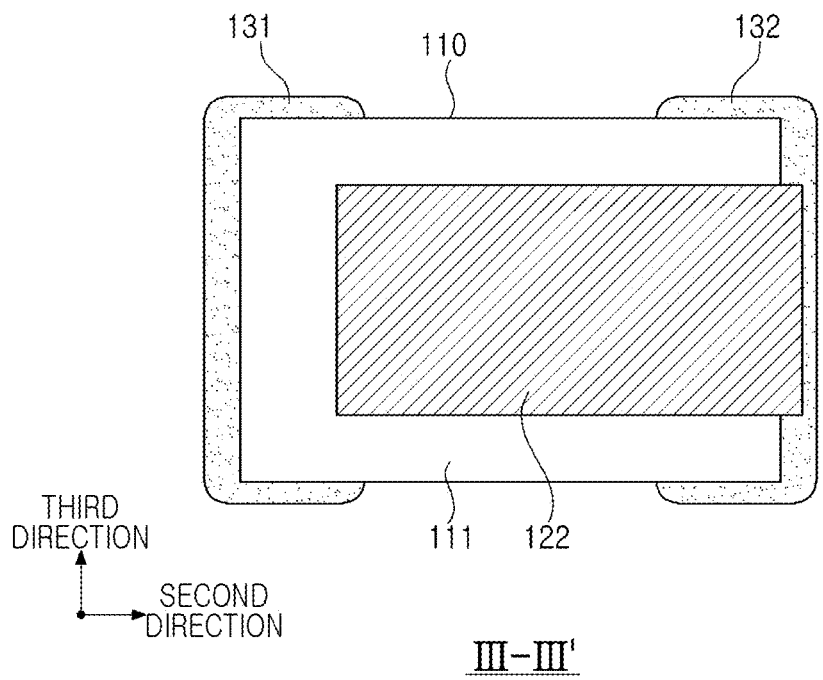
FIG. 5 is a cross-sectional view taken along line III-III' of FIG. 2.

FIG. 5 is a cross-sectional view taken along line III-III' of FIG. 2.

Figure 6:
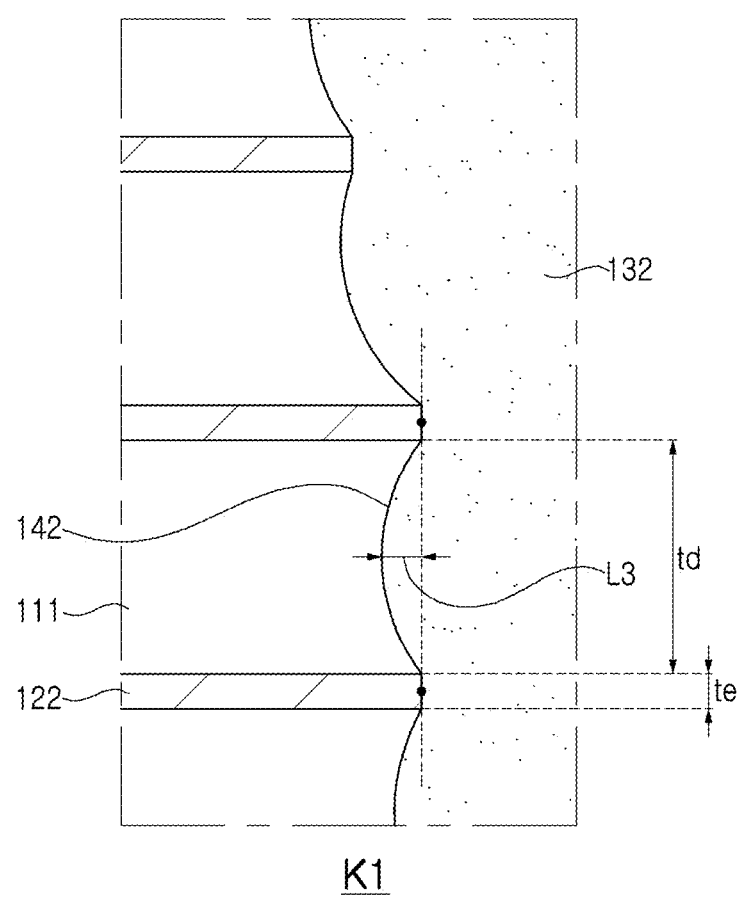
FIG. 6 is an enlarged view of region K1 of FIG. 2.

FIG. 6 is an enlarged view of region K1 of FIG. 2.

Referring to the drawings, a multilayer electronic component 100 according to an embodiment may include a body 110 including a capacitance formation portion (Ac) including dielectric layers 111 and internal electrodes 121 and 122 alternately disposed in a first direction, and cover portions C1 and C2 disposed on both end surfaces of the capacitance formation portion opposing each other in the first direction, and having first and second surfaces 1 and 2 opposing in the first direction, third and fourth surfaces 3 and 4 connected to the first and second surfaces and opposing each other in the second direction, and fifth and sixth surfaces 5 and 6 connected to the first to fourth surfaces and opposing each other in the third direction; and external electrodes 131 and 132 disposed on the third and fourth surfaces. On at least one of the third and fourth surfaces 3 and 4, the internal electrodes 121 and 122 and the dielectric layer 111 of the capacitance formation portion protrude more outwardly than the cover portions C1 and C2 in the second direction, and grooves 141 and 142 may be disposed at ends of the dielectric layer 111 in the second direction.

According to an embodiment, on at least one of the third and fourth surfaces 3 and 4, the internal electrodes 121 and 122 of the capacitance formation portion Ac further protrude outward in the second direction than the cover portions C1 and C2, and therefore, variations in capacitance of the multilayer electronic component may be reduced.

In addition, on at least one of the third and fourth surfaces 3 and 4, the dielectric layer 111 of the capacitance formation portion Ac protrudes outwardly of the cover portions C1 and C2 in the second direction, and contact between the body 110 and the external electrodes 131 and 132 may be improved by disposing the grooves 141 and 142 at the ends of the dielectric layer 111 in the second direction.

Hereinafter, respective components included in the multilayer electronic component 100 according to an embodiment will be described in more detail.

The body 110 may have a substantially hexahedral shape or a shape similar thereto, and for example, the body 110 may have first and second surfaces 1 and 2 opposing in the first direction, third and fourth surfaces 3 and 4 connected to the first and second surfaces 1 and 2 and opposing in the second direction, and fifth and sixth surfaces 5 and 6 connected to the first to fourth surfaces 1, 2, 3 and 4 and opposing in the third direction.

The first, second, fifth, and sixth surfaces 1, 2, 5, and 6 may be substantially flat surfaces. On the other hand, as the internal electrodes 121 and 122 and the dielectric layer 111 of the capacitance formation portion Ac protrude outward in the second direction, a step may be formed on at least one of the third and fourth surfaces 3 and 4 between the capacitance formation portion Ac and the cover portions C1 and C2, to be described later. At least a portion of the third and/or fourth surfaces 3 and 4 may have a convex shape outward in the second direction, but the present disclosure is not limited thereto.

In the body 110, dielectric layers 111 and internal electrodes 121 and 122 may be alternately stacked. The plurality of dielectric layers 111 forming the body 110 are in a sintered state, and the boundary between adjacent dielectric layers 111 may be integrated to such an extent that it is difficult to confirm without using a scanning electron microscope (SEM).

The dielectric layer 111 may be formed by preparing a ceramic slurry for a dielectric layer, containing ceramic powder, an organic solvent and a binder, applying and drying the slurry on a carrier film to prepare a ceramic green sheet for a dielectric layer, and then, sintering the ceramic green sheet for the dielectric layer. The ceramic powder is not particularly limited as long as sufficient capacitance may be obtained, but, for example, barium titanate-based (Ba-TiO$_3$)-based powder may be used.

The body 110 may include the capacitance formation portion Ac including dielectric layers 111 and internal electrodes 121 and 122 alternately disposed in the first direction, and first and second cover portions C1 and C2 disposed on both end surfaces of the capacitance formation portion Ac facing each other in the first direction. The cover portions C1 and C2 may basically serve to prevent damage to the internal electrodes due to physical or chemical stress.

The internal electrodes 121 and 122 of the capacitance formation portion Ac include first and second internal electrodes 121 and 122, one end of the first internal electrode 121 may be connected to the third surface 3, and one end of the second internal electrode 122 may be connected to the fourth surface 4. The first internal electrode 121 and the second internal electrode 122, which are a pair of electrodes having different polarities, may be disposed to face each other with the dielectric layer 111 interposed therebetween.

The cover portions C1 and C2 may be formed by preparing a ceramic slurry for a cover portion containing ceramic powder, an organic solvent, and a binder, applying and drying the slurry on a carrier film to prepare a ceramic green sheet for a cover portion, and then, stacking one or more ceramic green sheets for the cover portion on both end surfaces of the capacitance formation portion Ac in the first direction and sintering the same. The cover portions C1 and C2 may have the same dielectric composition as a dielectric composition of the dielectric layer 111 except that they do not include internal electrodes, but the present disclosure is not limited thereto. For example, the cover portions C1 and C2 may have a different dielectric composition from a dielectric composition of the dielectric layer 111.

The average thickness of the cover portions does not need to be particularly limited. However, to downsize and increase the capacitance of the multilayer electronic component, the average thickness of the cover portions C1 and C2 may be 25 µm or less. In this case, the average thickness of the cover portions refers to an average thickness of each of the first cover portion C1 and the second cover portion C2.

The average thickness of the cover portions C1 and C2 may refer to the average size of the cover portions C1 and C2 in the first direction, and may be an average value of sizes in the first direction measured at five equally spaced points in a cross section of the body 110 in the first and second directions.

The external electrodes 131 and 132 may be disposed on the third and fourth surfaces 3 and 4 of the body 110. In detail, the external electrodes 131 and 132 include a first external electrode 131 disposed on the third surface 3 and connected to the first internal electrodes 121, and a second external electrode 132 disposed on the fourth surface 4 and connected to the second internal electrodes 122.

The external electrodes 131 and 132 may be formed by dipping the third and fourth surfaces 3 and 4 of the body 110 into a conductive paste for external electrodes containing a conductive metal and glass, or transferring the sheet including a conductive metal and glass to the third and fourth surfaces 3 and 4 of the body 110, respectively, and then sintering the same. The conductive metal included in the external electrodes 131 and 132 does not need to be particularly limited, but may include, for example, at least one of Cu, Ni, Ag, Pd, Sn, Cr, Ti, Au, Pt, or alloys thereof.

Although not illustrated, a first plating layer may be disposed on the first external electrode 131 and a second plating layer may be disposed on the second external electrode 132. The first and second plating layers may improve mounting characteristics, may be plating layers including Ni, Sn, Pd, and/or alloys including the same, or may be formed of a plurality of layers. In addition, the first and second plating layers may be formed in a form in which, for example, a Ni plating layer and a Sn plating layer are sequentially stacked.

According to an embodiment, on at least one of the third and fourth surfaces 3 and 4 of the body 110, the internal electrodes 121 and 122 of the capacitance formation portion Ac may protrude more outwardly than the cover portions C1 and C2 in the second direction. In detail, on the third surface 3, the first internal electrode 121 protrudes more outwardly than the cover portions C1 and C2 in the second direction, and on the fourth surface 4, the second internal electrode 122 may protrude more outwardly than the cover portions C1 and C2 in the second direction. Accordingly, the contact between the internal electrodes 121 and 122 and the external electrodes 131 and 132 may be improved, and as a result, the deviation of the capacitance of the multilayer electronic component may be reduced.

A method of protruding the internal electrodes 121 and 122 outward in the second direction does not need to be particularly limited. For example, when a binder of a content lower than the content of a binder contained in the ceramic slurry for forming the cover portion and the ceramic slurry for forming the dielectric layer is added to the conductive paste for internal electrodes containing the conductive metal, or when the internal electrode is formed by a sputtering method, a vacuum deposition method, and/or a chemical vapor deposition method (CVD), the internal electrodes 121 and 122 may have a higher density than the density of the dielectric layer 111 and the cover portions C1 and C2, and as a result, the shrinkage rate due to sintering is lowered, and therefore, the internal electrodes 121 and 122 may protrude outwardly in the second direction.

In addition, due to the mutual influence between the internal electrodes 121 and 122 having a higher density than the density of the dielectric layer 111 and the cover portions C1 and C2, the internal electrodes 121 and 122 disposed in the central region of the body 110 in the first direction may protrude more outwardly in the second direction than the internal electrodes 121 and 122 disposed in the outermost parts of the body 110 in the first direction. Accordingly, the protrusion size of the internal electrodes 121 and 122 relative to the cover portions C1 and C2 may decrease from the center of the body 110 toward the cover portions C1 and C2 in the first direction. Accordingly, referring to FIG. 3, a line IL1 connecting one ends of the first internal electrodes 121 has a convex shape toward the first external electrode 131, and a line IL2 connecting one ends of the second internal electrodes 122 may have a convex shape toward the second external electrode 132.

Referring to FIG. 2, in an embodiment, when the protrusion size of the internal electrodes 121 and 122 with respect to the cover portions C1 and C2, measured in the center of the body 110 in the first direction, is L1, and when the protrusion size of the internal electrodes 121 and 122 disposed on the outermost side of the body 110 in the first direction with respect to the cover portions C1 and C2 is L2, L1/L2 may be greater than or equal to 1.2. When L1/L2 satisfies 1.2 or more, an effect of improving contact between the body 110 and the external electrodes 131 and 132 may be more significant. The upper limit of L1/L2 does not need to be particularly limited, but may be, for example, 10.0 or less.

Referring to FIGS. 2 and 4, in an embodiment, when the size of the internal electrodes 121 and 122 in the second direction measured in the center of the body 110 in the first direction is L1', $0.001 \leq L1/L1' \leq 0.1$ may be satisfied. When L1/L1' is less than 0.001, the protruding size of the internal electrodes 121 and 122 is not sufficient, so that the effect of improving the contact between the internal electrodes 121 and 122 and the external electrodes 131 and 132 may be insignificant. When L1/L1' exceeds 0.1, the size of protrusion of the internal electrodes 121 and 122 is excessive, and cracks may occur in the body 110.

On the other hand, L1, L2, and L1' may be measured from an image obtained by scanning a cross-section of the body 110 in the first and second directions, cut from the center in the third direction, with a scanning electron microscope (SEM).

The average thickness (te) of the internal electrode does not need to be particularly limited. In this case, the thickness of the internal electrodes 121 and 122 may refer to the size of the internal electrodes 121 and 122 in the first direction. Meanwhile, in the related art, a process of polishing third and fourth surfaces of a body is separately performed to secure contact between an internal electrode and an external electrode. However, there is a problem in that the reliability of the multilayer electronic component is lowered due to cracks or delamination of the body due to such a polishing process. On the other hand, according to an embodiment of the present disclosure, since the internal electrodes 121 and 122 of the capacitance formation portion Ac protrude more outwardly than the cover portions C1 and C2 in the second direction, and since a separate process for securing contact between the internal electrodes 121 and 122 and the external electrodes 131 and 132 is not required, even when the average thickness te of the internal electrodes 121 and 122 is 0.3 μm or less, reliability of the multilayer electronic component may be secured. The lower limit of the average thickness te of the internal electrodes 121 and 122 may be, for example, 0.05 μm or more, but the present disclosure is not limited thereto.

In this case, the average thickness te of the internal electrodes 121 and 122 may be measured by scanning a cross section of the body 110 in the first and second directions with a scanning electron microscope (SEM) at a magnification of 10,000. In detail, the average value may be measured by measuring the thickness at a plurality of points of one internal electrode 121 or 122, for example, at 30 points equally spaced in the second direction. The 30 equally spaced points may be designated in the capacitance formation portion Ac. In addition, if the average value is measured by extending this average value measurement to 10 internal electrodes 121 and 122, the average thickness of the internal electrodes 121 and 122 may be further generalized.

In an embodiment, when the standard deviation of the thicknesses of the internal electrodes 121 and 122 is σte, σte/te may be 0.05 or less. When σte/te is 0.05 or less, a phenomenon in which stress is non-uniformly applied to the internal electrodes 121 and 122 may be prevented by ensuring uniformity of thickness of the internal electrodes 121 and 122, and as a result, the internal electrodes 121 and 122 may be prevented from being lumped together or broken.

The standard deviation (σte) of the thickness of the internal electrode may be measured by subtracting the average thickness (te) of the internal electrodes from each thickness measured at 30 equally spaced points in the second direction for measuring the average thickness (te) of the internal electrodes 121 and 122, and then squaring the same, and calculating the variance by calculating the average value of these values, and then taking the square root of the variance value.

The internal electrodes 121 and 122 may be formed by applying a conductive paste for internal electrodes containing a conductive metal to a predetermined thickness on a ceramic green sheet and sintering the same. In detail, the internal electrodes 121 and 122 may be formed by sputtering and/or depositing the conductive metal on the ceramic green sheet using a sputtering method, a vacuum deposition method, and/or a chemical vapor deposition method, and in more detail, the internal electrodes 121 and 122 may be sputtering layers formed by a sputtering method.

In the case in which internal electrodes are formed by printing conductive paste for internal electrodes, necking may occur between conductive metals during a sintering process, which may cause internal electrodes to become lumped together and/or disconnected. Such disconnection of internal electrodes may cause a problem of reducing the capacitance of the multilayer electronic component and degrading the insulation resistance characteristics.

Meanwhile, when the internal electrodes 121 and 122 are sputtering layers, the internal electrodes 121 and 122 may have a relatively high density, and accordingly, aggregation and/or disconnection of the internal electrodes due to sintering may be prevented. In addition, when the internal electrodes 121 and 122 are sputtering layers, the average thickness te of the internal electrodes 121 and 122 and the standard deviation σte of the internal electrode thickness may be easily reduced.

The conductive metal included in the internal electrodes 121 and 122 may be at least one of Ni, Cu, Pd, Ag, Au, Pt, In, Sn, Al, Ti, or alloys thereof, but the present disclosure is not limited thereto.

According to an embodiment of the present disclosure, in at least one of the third and fourth surfaces 3 and 4, the dielectric layer 111 of the capacitance formation portion Ac may protrude outwardly further than the cover portions C1 and C2 in the second direction, and grooves 141 and 142 may be disposed in end portions of the dielectric layer 111 in the second direction. The contact area between the body 110 and the external electrodes 131 and 132 may be improved by disposing the grooves 141 and 142 at the end of the dielectric layer 111 protruding outwardly in the second direction, and as a result, contact between the external electrodes 131 and 132 of the body 110 may be improved.

In this case, the grooves 141 and 142 may include a first groove 141 disposed on the third surface 3 and a second groove 142 disposed on the fourth surface 4, and one first groove 141 may be disposed between two first internal electrodes 121 adjacent in the first direction, and one second groove 142 may be disposed between two second internal electrodes 122 adjacent in the first direction.

In addition, at least portions of the external electrodes 131 and 132 may be disposed within the grooves 141 and 142. Since at least portions of the external electrodes 131 and 132 are disposed in the grooves 141 and 142, a contact area between the body 110 and the external electrodes 131 and 132 may be increased through an anchoring effect. To significantly increase the anchoring effect, at least portions of the external electrodes 131 and 132 may be disposed in contact with the dielectric layer 111 and/or the internal electrodes 121 and 122 within the grooves 141 and 142, but the present disclosure is not limited thereto.

A method of protruding the dielectric layer 111 outward in the second direction does not need to be particularly limited. For example, the internal electrodes 121 and 122 have a relatively high density by being formed by a sputtering method or the like, and accordingly, when the shrinkage rate of the internal electrodes 121 and 122 due to sintering is lower than the shrinkage rate of the dielectric layer 111 and the cover portions C1 and C2 due to sintering, during the sintering process, the internal electrodes 121 and 122 may hinder shrinkage of the dielectric layer 111 due to sintering. On the other hand, since the internal electrodes are not disposed on the cover portions C1 and C2, the cover portions C1 and C2 are less subject to contraction interference. As a result, the dielectric layer 111 may protrude outward in the second direction compared to the cover portions C1 and C2.

In addition, since the outermost region of one dielectric layer 111 in the first direction is in contact with the internal electrodes 121 and 122 having a relatively low shrinkage rate by sintering, and since the center region of one dielectric layer 111 in the first direction is spaced apart from the internal electrodes 121 and 122 having a low shrinkage rate, a difference in shrinkage due to sintering may occur between the outermost region and the central region of one dielectric layer 111 in the first direction. Accordingly, the grooves 141 and 142 may be formed in the ends of the dielectric layer 111 in the second direction.

In addition, in one dielectric layer 111, a region adjacent to the internal electrodes 121 and 122 may be greatly hindered from contraction due to sintering, and accordingly, each of the grooves 141 and 142 may have a recess including a curved surface convex toward the dielectric layer 111. Since the grooves 141 and 142 have a convex curved surface toward the dielectric layer 111, the contact area between the body 110 and the external electrodes 131 and 132 may be significantly increased, thereby improving bonding strength.

The average thickness (td) of the dielectric layer 111 does not need to be particularly limited. As described above, according to an embodiment, since the internal electrodes 121 and 122 and the dielectric layer 111 of the capacitance formation portion Ac protrude more outwardly than the cover portions C1 and C2 in the second direction and thus a separate polishing process is not required, even when the average thickness (td) of the dielectric layer 111 is 1 μm or less, the reliability of the multilayer electronic component may be secured.

In this case, the average thickness td of the dielectric layer may refer to the average thickness of the dielectric layer 111 disposed between the internal electrodes 121 and 122. The average thickness (td) of the dielectric layer 111 may be measured by scanning the cross section of the body 110 in the first and second directions with a scanning electron microscope (SEM) at a magnification of 10,000. In detail, an average value may be measured by measuring thicknesses at a plurality of points of one dielectric layer 111, for example, at 30 points equally spaced in the second direction. The 30 equally spaced points may be designated in a capacitance formation portion (Ac) to be described later. In addition, if the average value is measured by extending this average value measurement to 10 dielectric layers 111, the average thickness of the dielectric layer 111 may be further generalized.

On the other hand, there is no need to specifically limit a maximum size L3 of the grooves 141 and 142 in the second direction. However, in an embodiment, L3≤td may be satisfied. By satisfying the above conditions, the contact area between the body 110 and the external electrodes 131 and 132 may be improved and cracks may also be prevented from occurring in the body 110. If L3 is greater than td, the size of the grooves 141 and 142 is excessive, and cracks may occur in the body 110. In this case, when the plurality of grooves 141 and 142 are disposed, L3 may refer to the maximum size of each of the plurality of grooves 141 and 142 in the second direction.

Referring to FIG. 6, the L3 may refer to a maximum value of the distance from the second groove 142 to a virtual line in the second direction by drawing the virtual line connecting central points of respective one ends of the two second internal electrodes 122 adjacent in the first direction with the second groove 142 interposed therebetween. Similarly, the L3 may refer to a maximum value of the distance from the first groove 141 to a virtual line in the second direction by drawing the virtual line connecting central points of respective one ends of the two first internal electrodes 121 adjacent in the first direction with the first groove 141 interposed therebetween.

The L3 may be measured by scanning the end side of the dielectric layer 111 in the second direction with a scanning electron microscope (SEM) with a magnification of 10,000 or more, in the cross section cut in the first and second directions in the center of the body 110 in the third direction.

Hereinafter, a multilayer electronic component according to another embodiment will be described. However, the multilayer electronic component according to an embodiment may have the same configuration as the above-described multilayer electronic component according to an embodiment. Therefore, description overlapping with the above-described embodiment will be omitted.

A multilayer electronic component 100 according to another embodiment may include a body 110, which includes a capacitance formation portion (Ac) including a dielectric layer 111 and first and second internal electrodes 121 and 122 alternately disposed in a first direction with the dielectric layer 111 interposed therebetween, and cover portions C1 and C2 disposed on both end surfaces of the capacitance formation portion, facing each other in the first direction, the body 110 having first and second surfaces 1 and 2 opposing each other in the first direction, third and fourth surfaces 3 and 4 connected to the first and second surfaces and opposing each other in the second direction, and fifth and sixth surfaces 5 and 6 connected to the first to fourth surfaces and opposing each other in the third direction; and first and second external electrodes 131 and 132 respectively disposed on the third and fourth surfaces and respectively connected to the first and second internal electrodes. On the third surface 3, the first internal electrode 121 protrudes more outwardly than the cover portions C1 and C2 in the second direction, and on the fourth surface 4, the second internal electrode 122 protrudes more outwardly than the cover portions C1 and C2 in the second direction, and a surface in contact with the first external electrode 131 and the dielectric layer 111 and a surface in contact with the second external electrode 132 and the dielectric layer 111 may be curved surfaces.

On the third surface 3, the first internal electrode 121 protrudes more outwardly than the cover portions C1 and C2 in the second direction, and on the fourth surface 4, the second internal electrode 122 protrudes more outwardly than the cover portions C1 and C2 in the second direction, thereby improving contact between the internal electrodes 121 and 122 and the external electrodes 131 and 132, and as a result, reducing the deviation of capacitance of the multilayer electronic component.

In addition, a surface in contact with the first external electrode 131 and the dielectric layer 111 and a surface in contact with the second external electrode 132 and the dielectric layer 111 may be curved surfaces. In detail, in this case, the contact surface between the first external electrode 131 and the dielectric layer 111 may be a curved surface convex toward the dielectric layer 111, and a surface in contact with the second external electrode 132 and the dielectric layer 111 may be a curved surface convex toward the dielectric layer 111.

As the contact surface between the first external electrode 131 and the dielectric layer 111 and the contact surface between the second external electrode 132 and the dielectric layer 111 have a curved surface, the contact area between the body 110 and the external electrodes 131 and 132 may be significantly increased, and as a result, the bonding force between the body 110 and the external electrodes 131 and 132 may be improved through an anchoring effect.

As set forth above, according to an embodiment, contact between a body and an external electrode may be secured.

Variations in capacitance of a multilayer electronic component may be reduced.

An internal electrode having a relatively thin thickness may be implemented.

The present disclosure is not limited by the above-described embodiments and accompanying drawings, but is intended to be limited by the appended claims. Therefore, various forms of substitution, modification and change will be possible by those skilled in the art within the scope of the technical spirit of the present disclosure described in the claims, and this will also be said to fall within the scope of the present disclosure.

In addition, the expression 'an embodiment' does not indicate the same embodiment, and is provided to emphasize and describe different unique characteristics. However, an embodiment presented above is not excluded from being implemented in combination with features of another embodiment. For example, even if a matter described in one detailed embodiment is not described in another embodiment, and it may be understood as a description related to another embodiment, unless there is a description contradicting or contradicting the matter in another embodiment.

In addition, expressions such as first and second are used to distinguish one component from another, and do not limit the order and/or importance of the components. In some cases, without departing from the scope of rights, a first element may be named a second element, and similarly, a second element may be named a first element.

While embodiments have been illustrated and described above, it will be apparent to those skilled in the art that modifications and variations could be made without departing from the scope of the present disclosure as defined by the appended claims.

What is claimed is:

1. A multilayer electronic component comprising:
   a body including a capacitance formation portion including dielectric layers and internal electrodes alternately disposed in a first direction, and a cover portion disposed on both end surfaces of the capacitance formation portion facing each other in the first direction, the body having a first surface and a second surface opposing each other in the first direction, a third surface and a fourth surface connected to the first and second surfaces and opposing each other in a second direction, and a fifth surface and a sixth surface connected to the first to fourth surfaces and opposing each other in a third direction; and
   external electrodes disposed on the third and fourth surfaces,
   wherein on at least one of the third and fourth surfaces, the internal electrodes and the dielectric layers of the capacitance formation portion protrude more outwardly than the cover portion in the second direction, and
   a groove is disposed at an end of one of the dielectric layers in the second direction.

2. The multilayer electronic component of claim 1, wherein when a protruding size of the internal electrodes with respect to the cover portion measured in a center of the body in the first direction is L1, and a protruding size of the internal electrodes disposed at an outermost part of the body in the first direction with respect to the cover portion is L2, L1/L2 is 1.2 or more.

3. The multilayer electronic component of claim 2, wherein when a size of the internal electrodes in the second direction measured in the center of the body in the first direction is L1', 0.001≤L1/L1'≤0.1 is satisfied.

4. The multilayer electronic component of claim 1, wherein at least a portion of the external electrode is disposed within the groove.

5. The multilayer electronic component of claim 4, wherein the groove has a convex curved surface toward the dielectric layer.

6. The multilayer electronic component of claim 1, wherein the internal electrodes include first internal electrodes and second internal electrodes,
   wherein one ends of the first internal electrodes are connected to the third surface, and one ends of the second internal electrodes are connected to the fourth surface, and
   the external electrode includes a first external electrode disposed on the third surface and connected to the first internal electrodes and a second external electrode disposed on the fourth surface and connected to the second internal electrodes.

7. The multilayer electronic component of claim 6, wherein a line connecting the one ends of the first internal electrodes has a shape convex toward the first external electrode, and
   a line connecting the one ends of the second internal electrodes has a shape convex toward the second external electrode.

8. The multilayer electronic component of claim 6, wherein the groove includes first grooves disposed on the third surface and second grooves disposed on the fourth surface,
   in the first and second grooves, one first groove is disposed between two adjacent ones of the first internal electrodes in the first direction, and
   one second groove is disposed between two adjacent ones of the second internal electrodes in the first direction.

9. The multilayer electronic component of claim 1, wherein when an average thickness of the dielectric layers is td and a maximum size of the groove in the second direction is L3, L3≤td is satisfied.

10. The multilayer electronic component of claim 9, wherein td≤1 µm is satisfied.

11. The multilayer electronic component of claim 1, wherein when an average thickness of the internal electrodes is te, te≤0.3 µm is satisfied.

12. The multilayer electronic component of claim 1, wherein when an average thickness of the internal electrodes is te and a standard deviation of thicknesses of the internal electrodes is σte, σte/te is 0.05 or less.

13. The multilayer electronic component of claim 1, wherein the internal electrodes are sputtering layers.

14. A multilayer electronic component comprising:
   a body including a capacitance formation portion including a dielectric layer and first and second internal electrodes alternately disposed in a first direction with the dielectric layer interposed therebetween, and a cover portion disposed on both end surfaces of the capacitance formation portion facing each other in the first direction, the body having a first surface and a second surface opposing each other in the first direction, a third surface and a fourth surface connected to the first and second surfaces and opposing each other in a second direction, and a fifth surface and a sixth surface connected to the first to fourth surfaces and opposing each other in a third direction; and
   first and second external electrodes respectively disposed on the third and fourth surfaces and respectively connected to the first and second internal electrodes, wherein on the third surface, the first internal electrodes protrude more outwardly than the cover portion in the second direction, and on the fourth surface, the second internal electrodes protrude more outwardly than the cover portion in the second direction, and a surface in contact with the first external electrode and the dielectric layer and a surface in contact with the second external electrode and the dielectric layer are curved surfaces.

15. The multilayer electronic component of claim 14, wherein the surface in contact with the first external electrode and the dielectric layer is a curved surface convex toward the dielectric layer, and the surface in contact with the second external electrode and the dielectric layer is a curved surface convex toward the dielectric layer.

16. The multilayer electronic component of claim 14, wherein one ends of the first internal electrodes are connected to the third surface, and one ends of the second internal electrodes are connected to the fourth surface, and a line connecting the one ends of the first internal electrodes has a convex shape toward the first external electrode, and a line connecting the one ends of the second internal electrodes has a convex shape toward the second external electrode.

17. The multilayer electronic component of claim 14, wherein when an average thickness of the first internal electrodes or the second internal electrodes is te and a standard deviation of a thickness of the first internal electrode or the second internal electrodes is σte, σte/te is 0.05 or less.

18. The multilayer electronic component of claim 14, wherein the first internal electrodes or the second internal electrodes are sputtering layers.

19. A multilayer electronic component comprising:

a body including a capacitance formation portion including dielectric layers and internal electrodes alternately disposed in a first direction, and a cover portion disposed on both end surfaces of the capacitance formation portion facing each other in the first direction; and external electrodes disposed on outer surfaces of the capacitance formation portion and outer surfaces of the cover portion, opposing each other in a second direction orthogonal to the first direction, and respectively connected to the internal electrodes, wherein, in the second direction, ends of the internal electrodes of the capacitance formation portion protrude from the respective outer surfaces of the cover portion, and the ends of the internal electrodes disposed in a center region of the capacitance formation portion in the first direction protrude more outwardly than the ends of the internal electrodes disposed in an outer region of the capacitance formation portion in the first direction.

20. The multilayer electronic component of claim 19, wherein, in the second direction, ends of the dielectric layers of the capacitance formation portion protrude from the respective outer surfaces of the cover portion.

21. The multilayer electronic component of claim 20, wherein the ends of the dielectric layers disposed in the center region of the capacitance formation portion protrude more outwardly than the ends of the dielectric layers disposed in the outer region of the capacitance formation portion.

22. The multilayer electronic component of claim 19, wherein an end of one of the dielectric layers includes a recess having a curved surface.

* * * * *